United States Patent
Arinaga et al.

(10) Patent No.: US 9,024,459 B2
(45) Date of Patent: May 5, 2015

(54) WIND TURBINE GENERATOR, METHOD, AND PROGRAM THEREOF

(71) Applicant: Mitsubishi Heavy Industries, Ltd., Minato-ku, Tokyo (JP)

(72) Inventors: Shinji Arinaga, Tokyo (JP); Akira Yasugi, Tokyo (JP); Takatoshi Matsushita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/240,926

(22) PCT Filed: Oct. 3, 2012

(86) PCT No.: PCT/JP2012/075591
§ 371 (c)(1),
(2) Date: Feb. 25, 2014

(87) PCT Pub. No.: WO2013/054703
PCT Pub. Date: Apr. 18, 2013

(65) Prior Publication Data
US 2014/0217731 A1    Aug. 7, 2014

(30) Foreign Application Priority Data
Oct. 13, 2011 (JP) ................................ 2011-225921

(51) Int. Cl.
*F02D 9/00* (2006.01)
*F03D 7/02* (2006.01)

(52) U.S. Cl.
CPC ........... *F03D 7/0224* (2013.01); *F05B 2270/17* (2013.01); *F05B 2270/304* (2013.01); *Y02E 10/723* (2013.01); *F05B 2270/10711* (2013.01); *F03D 7/0284* (2013.01)

(58) Field of Classification Search
USPC ..................................................... 290/44, 55
See application file for complete search history.

(56) References Cited

U.S. PATENT DOCUMENTS

| 6,921,985 | B2 | 7/2005 | Janssen et al. | |
| 7,728,452 | B2* | 6/2010 | Arinaga et al. | 290/44 |
| 7,851,934 | B2* | 12/2010 | Nyborg | 290/44 |

FOREIGN PATENT DOCUMENTS

| JP | 2005-240725 A | 9/2005 |
| JP | 2007-506887 A | 3/2007 |

(Continued)

OTHER PUBLICATIONS

PCT/ISA/210, "International Search Report for PCT/JP2012/075591", Dec. 4, 2012.

(Continued)

*Primary Examiner* — Tho D Ta
(74) *Attorney, Agent, or Firm* — Manabu Kanesaka; Benjamin Hauptman; Kenneth Berner (57) ABSTRACT

A rotor having a plurality of wind turbine blades, a generator to be driven by rotation of the rotor, a pitch angle controller for controlling a pitch angle of the wind turbine blades according to a speed of a generator, and a comparing and selecting section are provided. When the voltage of the utility grid is a predetermined value or less, the pitch angle controller controls the pitch angle so that the wind turbine blades do not move to a fine side. Further, the comparing and selecting section compares a temporary pitch angle command value determined based on the speed of the generator with a previous value of a pitch angle command value, and when the temporary pitch angle command value is a command for controlling the wind turbine blades closer to the fine side than the previous value, outputs the previous value as a current pitch angle command value.

4 Claims, 5 Drawing Sheets

(56) References Cited

FOREIGN PATENT DOCUMENTS

| | | |
|---|---|---|
| JP | 2007-239599 A | 9/2007 |
| JP | 2008-283747 A | 11/2008 |
| JP | 2009-068379 A | 4/2009 |
| JP | 2010-159647 A | 7/2010 |
| WO | 2005/015012 A1 | 2/2005 |
| WO | 2008/031433 A1 | 3/2008 |
| WO | 2010/085988 A2 | 8/2010 |
| WO | 2010/095248 A1 | 8/2010 |

OTHER PUBLICATIONS

PCT/ISA/237, "Written Opinion of the International Searching Authority for PCT/JP2012/075591", Dec. 4, 2012.

* cited by examiner

WIND TURBINE GENERATOR, METHOD, AND PROGRAM THEREOF

RELATED APPLICATIONS

The present application is National Phase of International Application No. PCT/JP2012/075591 filed Oct. 3, 2012, and claims priority from, Japanese Application No. 2011-225921, filed Oct. 13, 2011.

TECHNICAL FIELD

The present invention relates to a wind turbine generator for controlling wind turbine blades at a pitch angle for repressing a load, for example, when a voltage of a utility grid drops, a method and a program of the wind turbine generator.

BACKGROUND ART

Conventionally, a wind turbine generator feedback-controls a speed of the generator. For example, when a voltage of a utility grid drops and an output power of the generator reduces instantly, a load is eliminated, and thus the speed of the generator rises. However, a pitch angle of wind turbine blades is controlled to a feather side so that the rise in the speed is repressed and the rotation of the generator is stopped.

For example, Patent Document 1 describes a technique that controls the pitch angle of the wind turbine blades through an output power supplied from an uninterrupted power supply when a low voltage event such as a drop in a voltage of a utility grid occurs.

CITATION LIST

Patent Literature

{PTL 1} U.S. Pat. No. 6,921,985

SUMMARY OF INVENTION

Technical Problem

However, in the conventional method, an output power of the generator is also feedback-controlled, and when the voltage of the utility grid drops and the output power of the generator momentarily reduces, the pitch angle is once controlled to a fine side in order to increase the output power. For this reason, a rise in the speed of the generator is assisted, the speed temporarily increases, and thus a load on wind turbine blades increases.

The present invention is devised from a viewpoint of such a problem, and provides a wind turbine generator for repressing a rise in a speed of a generator and reducing a load on wind turbine blades even when the voltage of the utility grid drops, a method and a program of the wind turbine generator.

Solution to Problem

In order to solve the above problem, the present invention employs the following means.

A first aspect of the present invention is a wind turbine generator including a rotor having a plurality of wind turbine blades, a generator to be driven by rotation of the rotor, and a pitch angle control means for controlling a pitch angle of the wind turbine blades according to a speed of the generator, wherein when a voltage of a utility grid is a predetermined value or less, the pitch angle control means controls the wind turbine blades based on a pitch angle command value for making the wind turbine blades unmovable to a fine side.

In the wind turbine generator from the first aspect having the rotor having the plurality of wind turbine blades, the generator to be driven by the rotation of the rotor, and the pitch angle control means for controlling the pitch angle of the wind turbine blades according to the speed of the generator, when the voltage of the utility grid is a predetermined value or less, the pitch angle is controlled so that the wind turbine blades do not move to the fine side.

When the voltage of the utility grid is the predetermined value or less and the generator output power reduces, the generator speed rises, but the pitch angle is controlled so that the wind turbine blades do not move to the fine side. For this reason, since after the pitch angle of the wind turbine blades is once controlled to the fine side according to the decrease in the generator output power, the rise in the generator speed is repressed, the rise in the generator speed is repressed further than the case where the pitch angle is controlled to the feather side. As a result, the load on the wind turbine blades when the voltage of the utility grid drops can be reduced, so that mechanical damages of the wind turbine blades and a bearing can be prevented.

In the wind turbine generator, it is preferable that the pitch angle control means has a comparing and selecting means for, when the voltage of the utility grid is the predetermined value or less, comparing a temporary pitch angle command value as a command value of a temporary pitch angle determined based on the speed of the generator with a previous value as the previous pitch angle command value, and when the temporary pitch angle command value is a command for controlling the wind turbine blades closer to the fine side than the previous value, outputting the previous value as the current pitch angle command value.

As a result, when the voltage of the utility grid is the predetermined value or less, the pitch angle command value is compared with a previous value, and the pitch angle command value is not controlled closer to the fine side than the previous one. For this reason, the rise in the generator speed can be repressed. The previous pitch angle command value is a pitch angle command value that is calculated at the last clock cycle.

The pitch angle control means of the wind turbine generator may determine the temporary pitch angle command value based on a first pitch angle control value determined by a difference between the speed of the generator and a rated speed, and a second pitch angle control value determined by a difference between an active power command and a rated power.

Since the pitch angle command value is determined according to the difference between the speed and the rated speed, and the difference between the output power and the rated power, it can be controlled within a rated range.

A second aspect of the present invention is a control method of a wind turbine generator for controlling a rotor having a plurality of wind turbine blades, a generator to be driven by rotation of the rotor, and a pitch angle of the wind turbine blades according to a speed of the generator, wherein the control method controls, when the voltage of the utility grid is a predetermined value or less, the wind turbine blades based on a pitch angle command value for making the wind turbine blades unmovable to a fine side.

A third aspect of the present invention is a control program of a wind turbine generator for controlling a rotor having a plurality of wind turbine blades, a generator to be driven by rotation of the rotor, and a pitch angle of the wind turbine blades according to a speed of the generator, wherein the control program allow, when a voltage of a utility grid is a predetermined value or less, a computer to execute a process for controlling the wind turbine blades based on a pitch angle command value for making the wind turbine blades immobile to a fine side.

Advantageous Effects of Invention

The present invention produces an effect such that even when the voltage of the utility grid drops, the load on the wind turbine blades can be reduced.

DESCRIPTION OF EMBODIMENTS

A wind turbine generator, a method and a program of the wind turbine generator according to one embodiment of the present invention are described below with reference to the drawings.

Figure 1:
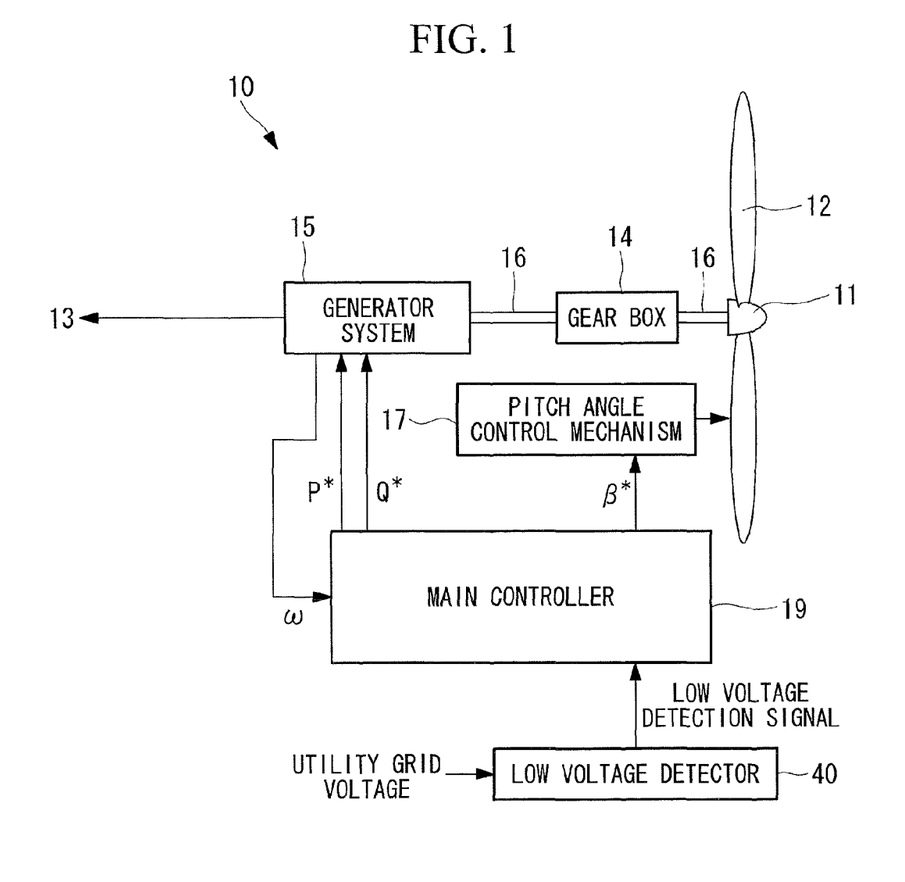
FIG. 1 is a diagram illustrating a schematic constitution of a wind turbine generator according to one embodiment.

As shown in FIG. 1, the wind turbine generator 10 according to this embodiment includes a wind turbine rotor 11, wind turbine blades 12, a gear box 14, a generator system 15, a pitch angle control mechanism 17, a main controller 19, and a low voltage detector 40. The wind turbine generator 10 is connected to a utility grid 13. Further, the wind turbine rotor 11, the gear box 14, and the generator system 15 are connected via a spindle 16.

A plurality of wind turbine blades 12 mounted to the wind turbine rotor 11 receives wind energy to rotate together with the wind turbine rotor 11, and is sped up by the gear box 14. Thereafter, a generator in the generator system 15 is driven to generate a power and converts the wind energy into electric energy. The wind turbine generator according to this embodiment is a variable speed rotation control type wind turbine generator, and uses a wound-rotor induction generator or a synchronous generator as the generator. The constitution using the synchronous generator uses an AC-DC-AC link system that once converts an output power of the generator into a direct current and again converts it into an alternate current through an inverter.

The low voltage detector 40 detects a voltage drop of a utility grid 13, and outputs a low voltage detection signal that is information for notifying about detection of the voltage drop of the utility grid 13 to the main controller 19. Further, in this embodiment, the low voltage detector 40 outputs a low voltage detection signal based on the voltage drop of the utility grid 13, but the present invention is not limited to this. The low voltage detector 40, for example, may detect a voltage of the generator, and may determine the voltage drop of the utility grid 13 based on the voltage drop of the generator so as to output a low voltage detection signal.

The main controller 19 determines and outputs an active power command P*, a reactive power command Q*, and a pitch angle command $\beta$* based on a generator speed $\omega$ measured in the generator system 15.

The pitch angle control mechanism 17 controls a pitch angle of the wind turbine blades 12 based on the pitch angle command $\beta$* and its constitution is similar to conventional one.

Figure 2:
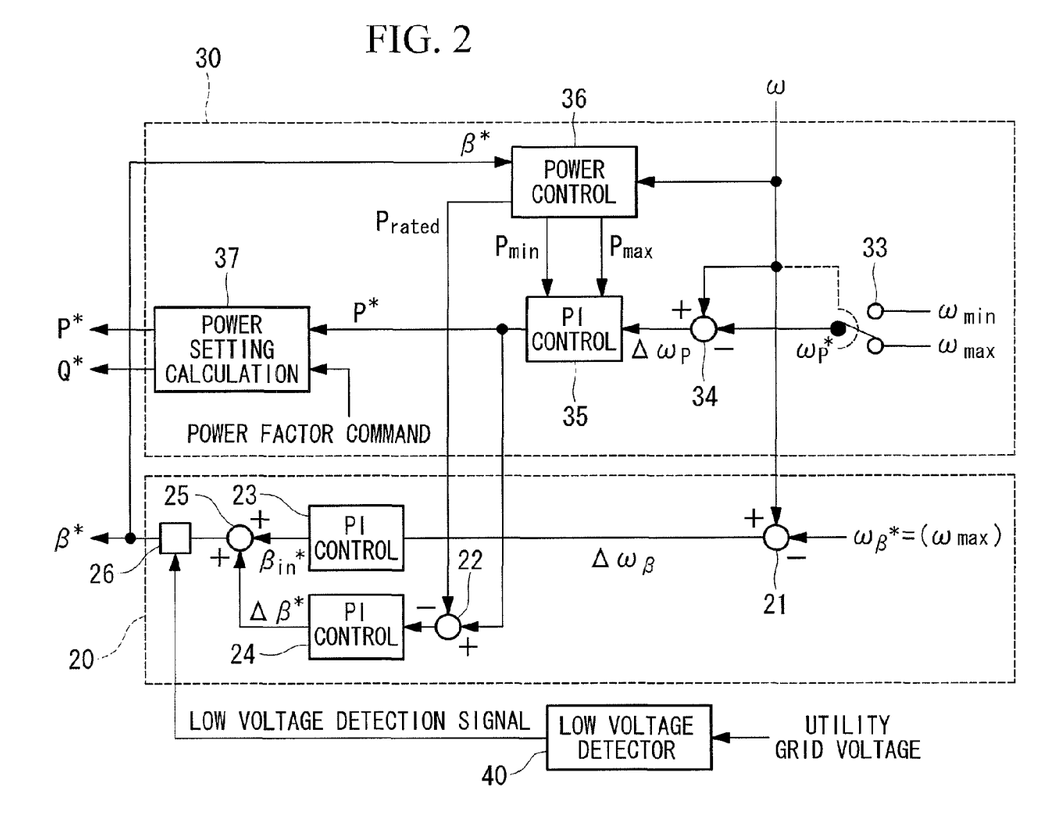
FIG. 2 is a function block diagram illustrating development of functions of a pitch angle controller, a power controller, and a low voltage detector.

FIG. 2 is a block diagram illustrating a schematic constitution of a pitch angle controller 20, a power controller 30, and the low voltage detector 40.

The power controller 30 has a switching unit 33, a first subtracter 34, a first PI controller 35, a power controller 36, and a power setting calculator 37. Further, the switching unit 33, the first subtracter 34, the first PI controller 35, the power controller 36, and the power setting calculator 37 execute a calculating step at each clock cycle of a system clock to be used in the main controller 19, so as to determine and output the active power command P* and the reactive power command Q*.

The switching unit 33 performs a switching operation between a minimum speed $\omega$min and a rated speed max based on the generator speed $\omega$, and sets any one selected speed as a power control speed command $\omega$P*. Concretely, when the generator speed $\omega$0 is the predetermined value or less, the switching unit 33 sets the power control speed command $\omega$P* as the minimum speed $\omega$min, and when the generator speed $\omega$ is larger than the predetermined value, it sets the power control speed command $\omega$P* as the rated speed $\omega$max.

The first subtracter 34 subtracts the power control speed command $\omega$P* from the generator speed $\omega$ so as to calculate a deviation $\Delta\omega$P.

The power controller 36 determines a power command lower limit Pmin and a power command upper limit Pmax for PI control in the first PI controller 35 based on the generator speed $\omega$ and the pitch angle command $\beta$* so as to output these information. The power controller 36 outputs information about a rated power Prated to a subtracter 22 of the pitch angle controller 20.

The first PI controller 35 responds to the deviation $\Delta\omega$P with the active power command P* being limited to a range between the power command lower limit Pmin and the power command upper limit Pmax and makes the PI control so as to determine the active power command P*.

The power setting calculator 37 calculates the reactive power command Q* based on the active power command P* generated by the first PI controller 35 and a power factor command for specifying a power factor of an alternating current power output from the wind turbine generator 10 and outputs the active power command P* and the reactive power command Q*.

The pitch angle controller 20 determines and outputs a pitch angle command value that is a command value of the pitch angle of the wind turbine blades 12 according to the generator speed $\omega$. Further, when the voltage of the utility grid 13 is a predetermined value or less (for example, 0.5 pu or less), the pitch angle controller 20 controls a pitch angle so that the wind turbine blades 12 do not move to the fine side.

Concretely, the pitch angle controller 20 includes a second subtracter 21, a third subtracter 22, a second PI controller 23, a third PI controller 24, an adder 25, and a comparing and selecting section (comparing and selecting means) 26. Further, the second subtracter 21, the third subtracter 22, the second PI controller 23, the third PI controller 24, the adder 25, and the comparing and selecting section 26 execute the calculating step at each clock cycle of the system clock to be used in the main controller 19 so as to determine and output the pitch angle command $\beta^*$.

The subtracter 21 subtracts a pitch control speed command $\omega\beta^*$ from the generator speed $\omega$ so as to calculate a deviation $\Delta\omega\beta$. The pitch control speed command $\omega\beta^*$ matches with the rated speed $\omega$max, and thus the deviation $\Delta\omega\beta$ represents the difference between the generator speed $\omega$ and the rated speed $\omega$max.

The second PI controller 23 makes the PI control in response to the deviation $\Delta\omega\beta$, and calculates a pitch angle command foundation value (first pitch angle control value) $\beta in^*$. The pitch angle command foundation value $\beta in^*$ is decided so that the generator speed $\omega$ is controlled to the rated speed $\omega$max.

The third subtracter 22 subtracts the rated power Prated from the active power command $P^*$ so as to calculate a deviation $\Delta P$.

The third PI controller 24 makes the PI control in response to the deviation $\Delta P$ so as to calculate a correction value (second pitch angle control value) $\Delta\beta^*$.

When the second PI controller 23 adjusts the generator speed $\omega$ to the rated speed $\omega$max, it undesirably discards aerodynamic energy that should be taken out as an electric power in some cases. In this embodiment, therefore, the third PI controller 24 calculates the correction value $\Delta\beta^*$ in response to the difference between the rated power Prated and the active power command $P^*$, and corrects the temporary pitch angle command $\beta'$ using the correction value $\Delta\beta^*$.

When the active power command $P^*$ is smaller than the rated power Prated, namely, the deviation $\Delta P$ (=$P^*$-Prated) is a negative value, the correction value $\Delta\beta^*$ is determined so that the temporary pitch angle command $\beta'$ is smaller than the pitch angle command foundation value $\beta in^*$, namely, the pitch angle $\beta$ is closer to the fine side. Such control represses a state that the pitch angle $\beta$ is on a feather side just before the active power command $P^*$ reaches the rated power Prated. After the active power command $P^*$ reaches the rated power Prated, the deviation $\Delta P$ is 0, and the correction value $\Delta\beta^*$ is also 0.

The adder 25 adds the pitch angle command foundation value (first pitch angle control value) $\beta in$ determined by the difference between the generator speed $\omega$ and the rated speed $\delta$max and the correction value (second pitch angle control value) $\Delta\beta^*$ determined by a difference between the active power command $P^*$ and the rated power Prated, so as to determine a temporary pitch angle command value $\beta'$.

When the voltage of the utility grid 13 is the predetermined value or less, the comparing and selecting section 26 compares the temporary pitch angle command value $\beta'$ as a command value of a temporary pitch angle determined based on the generator speed $\omega$ with the previous value $\beta$old as the previous pitch angle command value $\beta^*$. When the temporary pitch angle command value $\beta'$ is a command for controlling the wind turbine blades 12 closer to the fine side than the previous value $\beta$old, the previous value is output as the current pitch angle command value $\beta^*$. Further, the comparing and selecting section 26 determines that the voltage of the utility grid 13 is the predetermined value or less based on the low-voltage detection signal to be acquired.

The previous value (previous pitch angle command value) $\beta$old is the pitch angle command value $\beta^*$ calculated at the last clock cycle, and is stored in a storage section provided to the comparing and selecting section 26. In another form, the previous value $\beta$old is information that can be referred to by reading it from an external storage device connected to the comparing and selecting section 26 into the comparing and selecting section 26.

Figure 3:
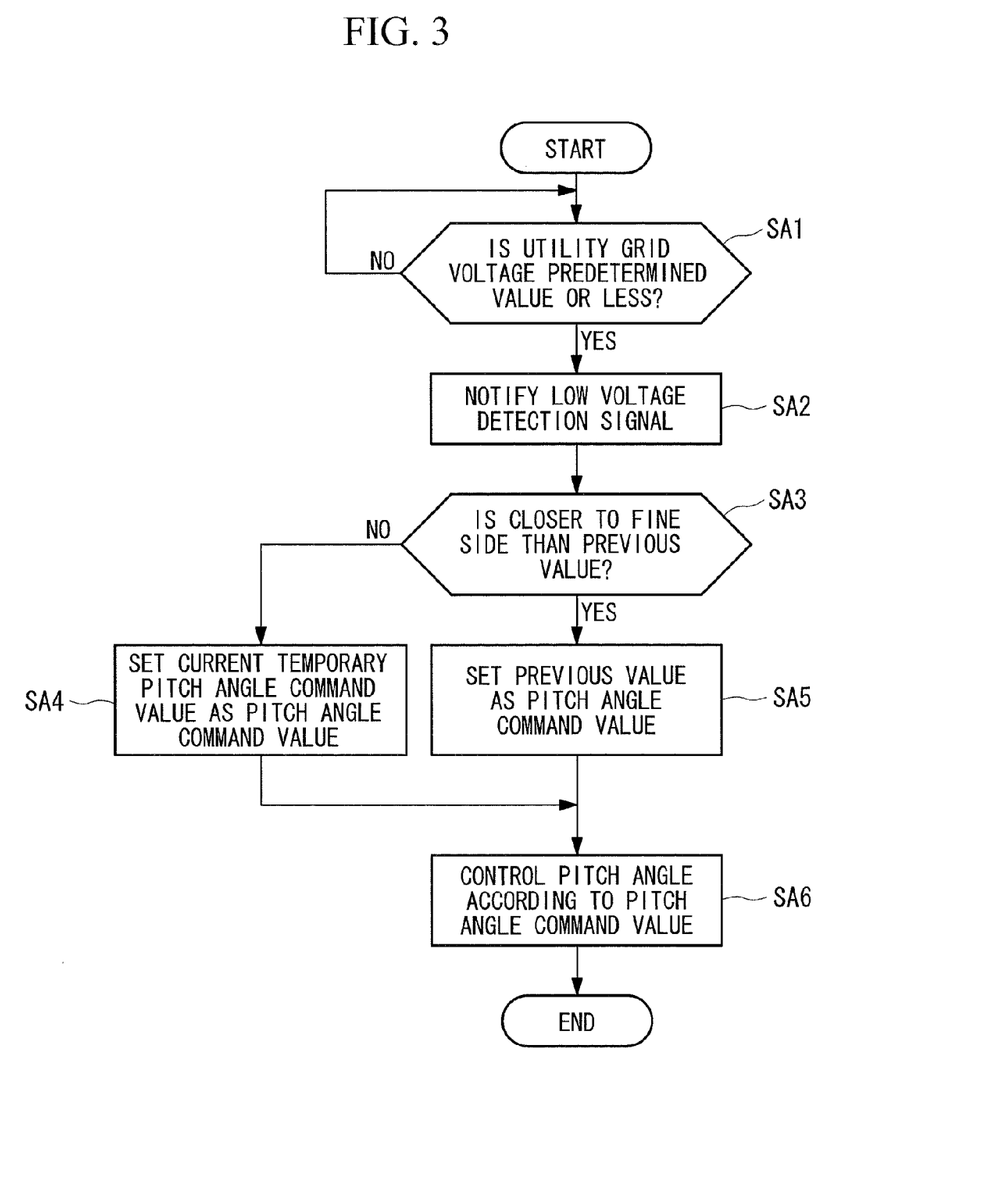
FIG. 3 is an operation flow of the wind turbine generator shown in FIG. 1.

FIG. 3 is a flowchart illustrating a control process in a case where the voltage of the utility grid 13 drops in the wind turbine generator 10 according to this embodiment.

In the wind turbine generator 10, the low voltage detector 40 detects the voltage of the utility grid 13 and determines whether the voltage of the utility grid is the predetermined value or less (step SA1). The determination is made that the voltage of the utility grid 13 is not the predetermined value or less, the process at step SA1 is repeated, and a determination is made that the voltage of the utility grid 13 drops at predetermined time intervals in the low voltage detector 40 continuously.

When the determination is made at step SA1 that the voltage of the utility grid 13 is the predetermined value or less, a low voltage detection signal is output to the comparing and selecting section 26 of the pitch angle controller 20 (step SA2).

When the comparing and selecting section 26 acquires a low voltage detection signal, a low voltage is deemed to have been generated, and the temporary pitch angle command value $\beta'$ calculated based on the generator speed $\omega$, the rated speed $\omega$max, the rated output power Prated and the active power command $P^*$ is compared with the previous value $\beta$old. A determination is made whether the temporary pitch angle command value $\beta'$ is a command for motion closer to the fine side than the previous value $\beta$old (step SA3).

When the temporary pitch angle command value $\beta'$ is not the command for the motion closer to the fine side than the previous value $\beta$old, the temporary pitch angle command value $\beta'$ calculated this time is output as the pitch angle command value $\beta^*$ (step SA4). Further, when the temporary pitch angle command value $\beta'$ is the command for the motion closer to the fine side than the previous value $\beta$old, the previous value $\beta$old is output as the pitch angle command value $\beta^*$ (step SA5). The wind turbine blades 12 are controlled based on the determined pitch angle command value $\beta^*$ (step SA6). As a result, when the voltage of the utility grid is the predetermined value or less, the pitch angle of the wind turbine blades 12 is not closer to the fine side than the previous value $\beta$old, and thus the rise in the speed is not assisted.

The following describes transition (FIG. 4) of the generator speed $\omega$ and the pitch angle in a case where the pitch angle is controlled without using the low voltage detector 40, and transition (FIG. 5) of the generator speed $\omega$ and the pitch angle in a case where the pitch angle is controlled using the low voltage detector 40 and the main controller 19 according to this embodiment.

Figure 4:
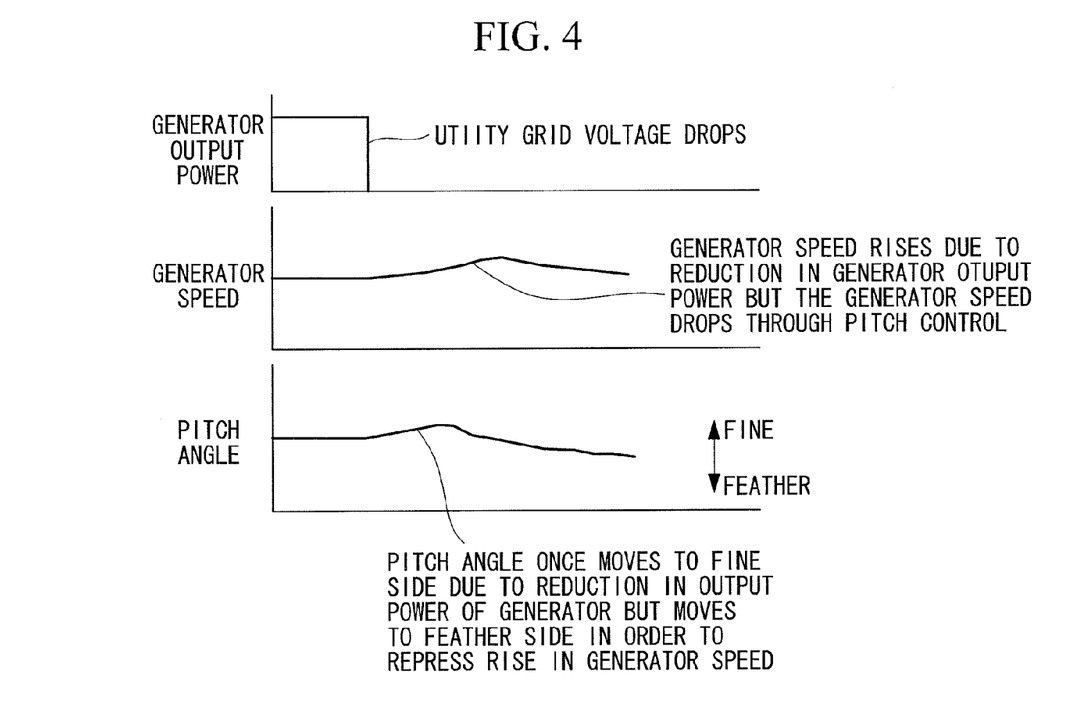
FIG. 4 is a diagram illustrating transition of a speed of the generator and a pitch angle in a case where the pitch angle is controlled without using the low voltage detector.

As shown in FIG. 4, when the pitch angle is controlled without using the low voltage detector 40 and the voltage of the utility grid 13 drops, the pitch angle of the wind turbine blades 12 is controlled to the fine side by feeding back information about the decrease in the generator output power. As a result, the generator speed rises. Thereafter, in order to repress the rise in the speed, the pitch angle is controlled to the feather side so that the generator speed gradually reduces. When the low voltage detector 40 is not used, when the wind turbine blades 12 are once controlled to the fine side, and then controlled to the feather side in response to the rise in the speed.

Figure 5:
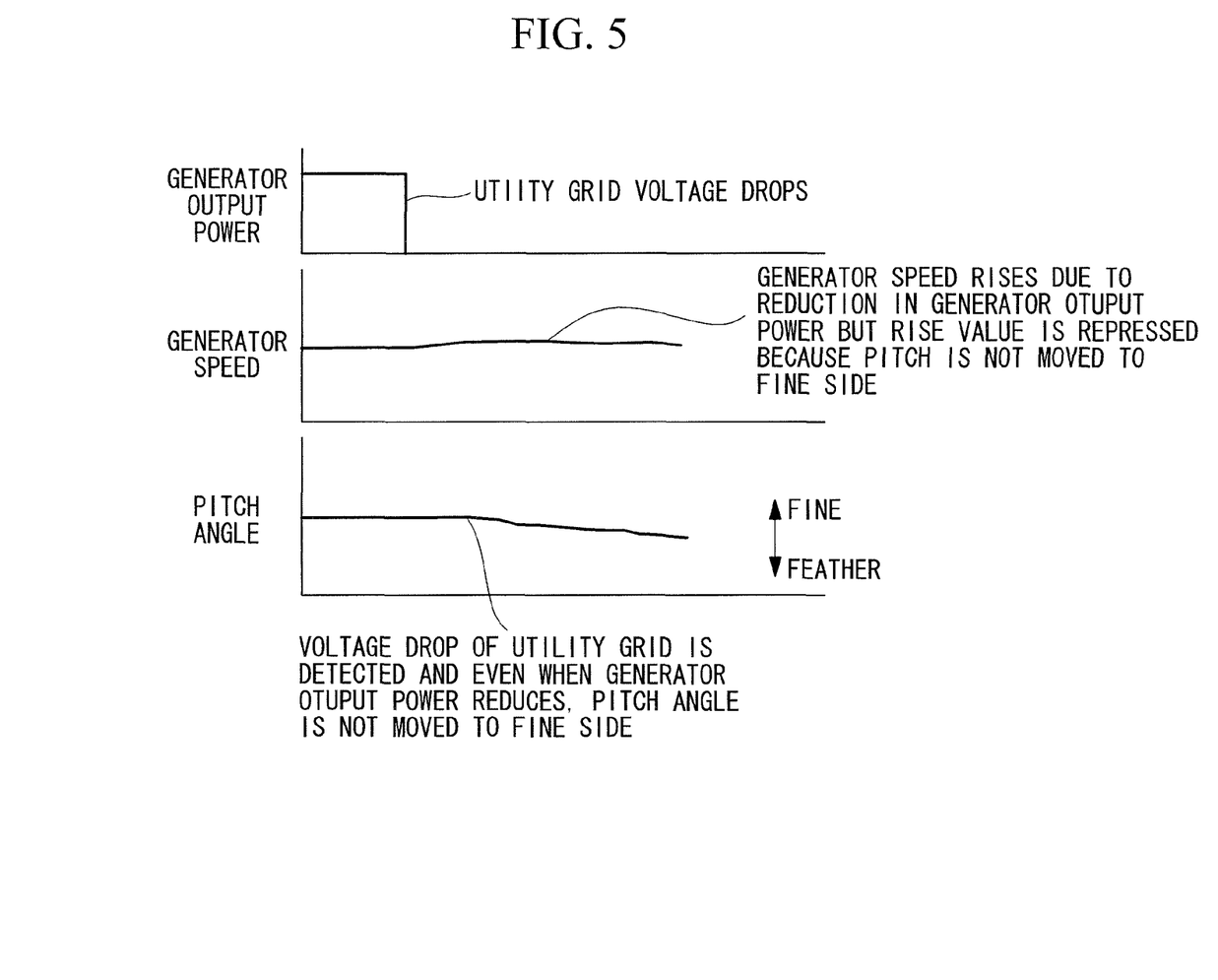
FIG. 5 is a diagram illustrating transition of the speed of the generator and the pitch angle in a case where the pitch angle is controlled by using the low voltage detector in the wind turbine generator shown in FIG. 1.

On the contrary, as shown in FIG. 5, in the control of the pitch angle according to this embodiment, when the voltage of the utility grid 13 drops and the generator output power reduces, the temporary pitch angle command value is compared with the previous value. When the temporary pitch angle command value is control for movement closer to the fine side than the previous value, the previous value is maintained and is controlled as the pitch angle command value. As a result, even when the voltage of the utility grid 13 drops, the pitch angle is controlled so that the motion to the fine side does not occur. As a result, the rise in the speed can be repressed, and a fluctuation of the pitch angle can be reduced.

As described above, according to the wind turbine generator 10, the method and the program of the wind turbine generator 10 according to this embodiment, in the wind turbine generator 10 having the rotor 11 having the plurality of wind turbine blades 12, the generator system 15 to be driven by the rotation of the rotor 11, and the pitch angle controller 20 for controlling the pitch angle of the wind turbine blades 12 according to the generator speed, when the voltage of the utility grid 13 is the predetermined value or less, the pitch angle is controlled based on the pitch angle command value that does not move the wind turbine blades 12 to the fine side.

When the voltage of the utility grid 13 is the predetermined value or less and the generator output power reduces, the generator speed ω rises, but the pitch angle is controlled so that the wind turbine blades 12 do not move to the fine side. For this reason, since after the pitch angle of the wind turbine blades 12 is once controlled to the fine side according to the decrease in the generator output power, the rise in the generator speed ω is repressed, the rise in the generator speed ω is repressed further than the case where the pitch angle is controlled to the feather side. As a result, the load on the wind turbine blades 12 when the voltage of the utility grid 13 drops can be reduced, so that mechanical damages of the wind turbine blades and a bearing can be prevented.

Further, when the calculated temporary pitch angle command value β' is compared with the previous value βold and is a command for controlling closer to the fine side than the previous value βold in the case where the voltage of the utility grid 13 is the predetermined value or less, the previous value βold is maintained to be employed as the pitch angle command value β*. As a result, the voltage of the utility grid 13 drops, the control to the fine side is not made, and the rise in the generator speed ω can be repressed.

REFERENCE SIGNS LIST 10 wind turbine generator
13 utility grid
19 main controller
20 pitch angle controller
26 comparing and selecting section
30 power controller
40 low voltage detector

The invention claimed is:

1. A wind turbine generator, comprising:
a rotor having a plurality of wind turbine blades;
a generator to be driven by rotation of the rotor; and
a pitch angle control part for controlling a pitch angle of the wind turbine blades according to a speed of the generator, wherein
when a voltage of a utility grid is a predetermined value or less, the pitch angle control part controls the wind turbine blades based on a pitch angle command value for making the wind turbine blades unmovable to a fine side, and the pitch angle control part comprises a comparing and selecting means for, when the voltage of the utility grid is the predetermined value or less, comparing a temporary pitch angle command value as a command value of a temporary pitch angle determined based on the speed of the generator with a previous value as the previous pitch angle command value; and when the temporary pitch angle command value is a command for controlling the wind turbine blades closer to the fine side than the previous value, outputting the previous value as the current pitch angle command value.

2. The wind turbine generator according to claim 1, wherein
the pitch angle control part determines the temporary pitch angle command value based on a first pitch angle control value determined by a difference between the speed of the generator and a rated speed, and a second pitch angle control value determined by a difference between an active power command and a rated power.

3. A control method of a wind turbine generator comprising a rotor having a plurality of wind turbine blades, a generator to be driven by rotation of the rotor, and a pitch angle control part for controlling a pitch angle of the wind turbine blades according to a speed of the generator, the control method comprising:
controlling the wind turbine blades based on a pitch angle command value for making the wind turbine blades immobile to a fine side when the voltage of the utility grid is a predetermined value or less;
comparing a temporary pitch angle command value as a command value of a temporary pitch angle determined based on the speed of the generator with a previous value as the previous pitch angle command value when the voltage of the utility grid is the predetermined value or less; and
outputting the previous value as the current pitch angle command value when the temporary pitch angle command value is a command for controlling the wind turbine blades closer to the fine side than the previous value.

4. A control program of a wind turbine generator for controlling a rotor having a plurality of wind turbine blades, a generator to be driven by rotation of the rotor, and a pitch angle of the wind turbine blades according to a speed of the generator, the control program allowing a computer to execute a process for:
controlling the wind turbine blades based on a pitch angle command value for making the wind turbine blades immobile to a fine side when a voltage of a utility grid is a predetermined value or less;
comparing a temporary pitch angle command value as a command value of a temporary pitch angle determined based on the speed of the generator with a previous value as the previous pitch angle command value when the voltage of the utility grid is the predetermined value or less; and
outputting the previous value as the current pitch angle command value when the temporary pitch angle command value is a command for controlling the wind turbine blades closer to the fine side than the previous value.

* * * * *